(12) United States Patent
Richter et al.

(10) Patent No.: US 9,030,380 B1
(45) Date of Patent: May 12, 2015

(54) METHOD, A DEVICE AND A SYSTEM FOR INTERACTING WITH THE TOUCH-SENSITIVE ELECTRONIC DISPLAY OF A COMPUTER

(71) Applicant: R2Z Innovations, Inc., Vancouver (CA)

(72) Inventors: Wolfgang Richter, NW (DE); Faranak Zadeh, Vancouver (CA)

(73) Assignee: R2Z Innovations Inc., Vancouver, BC (CA)

( * ) Notice: Subject to any disclaimer, the term of this patent is extended or adjusted under 35 U.S.C. 154(b) by 64 days.

(21) Appl. No.: 14/086,580

(22) Filed: Nov. 21, 2013

(51) Int. Cl.
| | |
|---|---|
| *G09G 5/00* | (2006.01) |
| *G06F 1/26* | (2006.01) |
| *G06F 3/044* | (2006.01) |
| *G06F 3/041* | (2006.01) |
| *A63F 13/2145* | (2014.01) |

(52) U.S. Cl.
CPC *G06F 1/26* (2013.01); *G06F 3/044* (2013.01); *G06F 3/0412* (2013.01); *A63F 13/2145* (2014.09)

(58) Field of Classification Search
USPC ........ 463/36–39, 46; 273/237, 238, 241, 242, 273/460; 345/4, 114, 153; 178/18.01–18.09
See application file for complete search history.

(56) References Cited

U.S. PATENT DOCUMENTS

| | | | | |
|---|---|---|---|---|
| 5,738,526 | A * | 4/1998 | Cerda et al. | 434/304 |
| 6,190,174 | B1 * | 2/2001 | Lam | 434/169 |
| 6,253,058 | B1 * | 6/2001 | Murasaki et al. | 434/308 |
| 6,773,325 | B1 * | 8/2004 | Mawle et al. | 446/175 |
| 7,018,213 | B2 * | 3/2006 | Marcus et al. | 434/322 |
| 7,203,455 | B2 * | 4/2007 | Ernst et al. | 434/317 |
| 2004/0067713 | A1 * | 4/2004 | Fong | 446/175 |
| 2004/0142310 | A1 * | 7/2004 | Marcus et al. | 434/156 |

* cited by examiner

*Primary Examiner* — Shaheda Abdin

(57) ABSTRACT

A method, system and an interactive device for interaction with the electric field of touch-sensitive electronic display of a computing device is provided. The interactive device includes a housing for positioning on the top of the touch-sensitive electronic display, a first electrode determines the touch position, an energy harvester for receiving the electrical energy and transforming the received electrical energy into a DC voltage, a controller generates a serial identification number for identifying the housing through the touch-sensitive electronic display of the computer, an electronic switch transmitting the serial identification number, a second electrode forms a close electrical circuit from the electric field generated by the touch-sensitive electronic display to operate the energy harvester, the controller and the electronic switch; and a third electrode for receiving the serial identification number and the processor of the computer determines the distance and angle in between the first electrode and the third electrode.

20 Claims, 5 Drawing Sheets

METHOD, A DEVICE AND A SYSTEM FOR INTERACTING WITH THE TOUCH-SENSITIVE ELECTRONIC DISPLAY OF A COMPUTER

BACKGROUND OF THE INVENTION

1. Field of the Invention

The present invention generally relates to devices used for interacting with the touch-sensitive electronic display of a computer, and more particularly relates to devices and related methods for interacting a device by harvesting the electric field of touch-sensitive electronic display of a computer.

2. Description of Related Art

Many devices have been created till now for interacting with the touch-sensitive electronic display of a computer, such as Stylus. With the increase in popularity of the IPAD's, various game applications have been created for user's entertainment which allows users to interact with the display of the computers. Such games are played by the users with the help of stylus, fingers and other objects.

These interactive devices work on the principle of having either with capacitive sensors or optical sensor are configured for receiving communication from the interactive display of the computer. The simplest way is stylus which can send additional information about the writing angel or applied pressure into the touch screen device. Such devices works on creating variations in patterns in order to identify the toys, thus only predetermined codes may be transferred over the touch screen device.

Conventionally companies have produced little plastic figures with a conductive surface of the lower side and if touched by a user, they create a pattern which the touch screen device to identify for use in a game play. A game application installed in the processor of the computer can determine the game piece and its orientation, and provide an interaction between game pieces and the touch screen of the computer based on their location and orientation.

Generally, they are identified by a touch screen device's software on the specific conductive pattern. Such devices are passive and need no extra power supply to operate, just the touch from the user. However, the number of patterns is limited by the possible combination of pattern and the maximum number of touch points on the screen at time (normally 10).

Also, various other interactive devices operate through the use of battery for conducting various processes directed by the processor of the computer. These battery operated interacted devices require a lot of power to operate various sensors attached on the devices.

Therefore, there is a need of an interactive device which utilizes the electric field produced from the interactive touch-screen display as the power source. Further, the interactive device should have one or more electrodes to transfer data over the touch screen sensitive to the processor of the computers.

SUMMARY OF THE INVENTION

In accordance with the teachings of the present invention, a method, a system and an interactive device for interacting with the electric field of a touch-sensitive electronic display of a computer, is provided.

An object of the present invention is to provide an interactive device for interacting with a capacitive touch-sensitive electronic display of a computing device includes a housing for positioning on the top of the touch-sensitive electronic display, a first electrode positioned inside the bottom portion of the housing to determine the touch position, an energy harvester is connected to the first electrode for receiving the electrical energy and transforming the received electrical energy into a DC voltage.

Further, the interactive device includes a controller to operate on the DC voltage received from the energy harvester and generates a serial identification number for identifying the housing through the touch sensitive electronic display of the computer, an electronic switch is connected to the controller for transmitting the serial identification number received from the controller, a second electrode positioned inside the housing and allowing the user to invoke a touch event, further the second electrode forms a close electrical circuit from the electric field generated by the touch-sensitive electronic display to operate the energy harvester, the controller and the electronic switch.

Further, the interactive device includes a third electrode positioned parallel to the first electrode inside the housing for receiving the serial identification number processed by the controller through the electronic switch and further the electronic switch connects the user with the third electrode to stimulate the temporarily touch pattern to inform about the direction and the serial identification number to the touch-sensitive electronic display and further wherein the processor of the computer determines the distance in between the first electrode and the third electrode, and further the processor leading to determination of the angle and direction of the touch events from the distance calculated in between the first electrode and the third electrode, further it leads to interaction of the housing from the serial identification number from the simulated temporarily touch pattern from the third electrode.

Another object of the present invention is to provide a buffer for storing extra DC voltage received from the energy harvester.

Another object of the present invention is to provide a light source attached to the housing and connected to the controller for signalling light signals.

Another object of the present invention is to provide a display unit attached on the housing and connected to the controller for displaying video signals.

Another object of the present invention is to provide an audio unit attached on the housing and connected to the controller for playing audio signals.

Another object of the present invention is to provide one or more sensors attached to the housing for sensing physical quantities and generating a signal readable and transmittable by the controller.

Another object of the present invention is to provide a fourth electrode connected to the first electrode within the housing for invoking a second touch event by the user for generating a second serial identification number from the controller and a second electronic switch to connected the fourth electrode with the third electrode connected by the controller for creating temporarily touch second pattern over the third electrode to the touch screen sensitive display to be calculated by the processor of the computer, further wherein the controller operates second electronic switch with the second serial identification number, further leading to the processor of the computer identifies the housing from the second identification number from the simulated temporarily second touch pattern from the third electrode.

These and other objects, features and advantages of the invention will become more fully apparent in the following detailed description, taken in conjunction with the accompanying drawings.

DETAILED DESCRIPTION OF DRAWINGS

Figure 1:
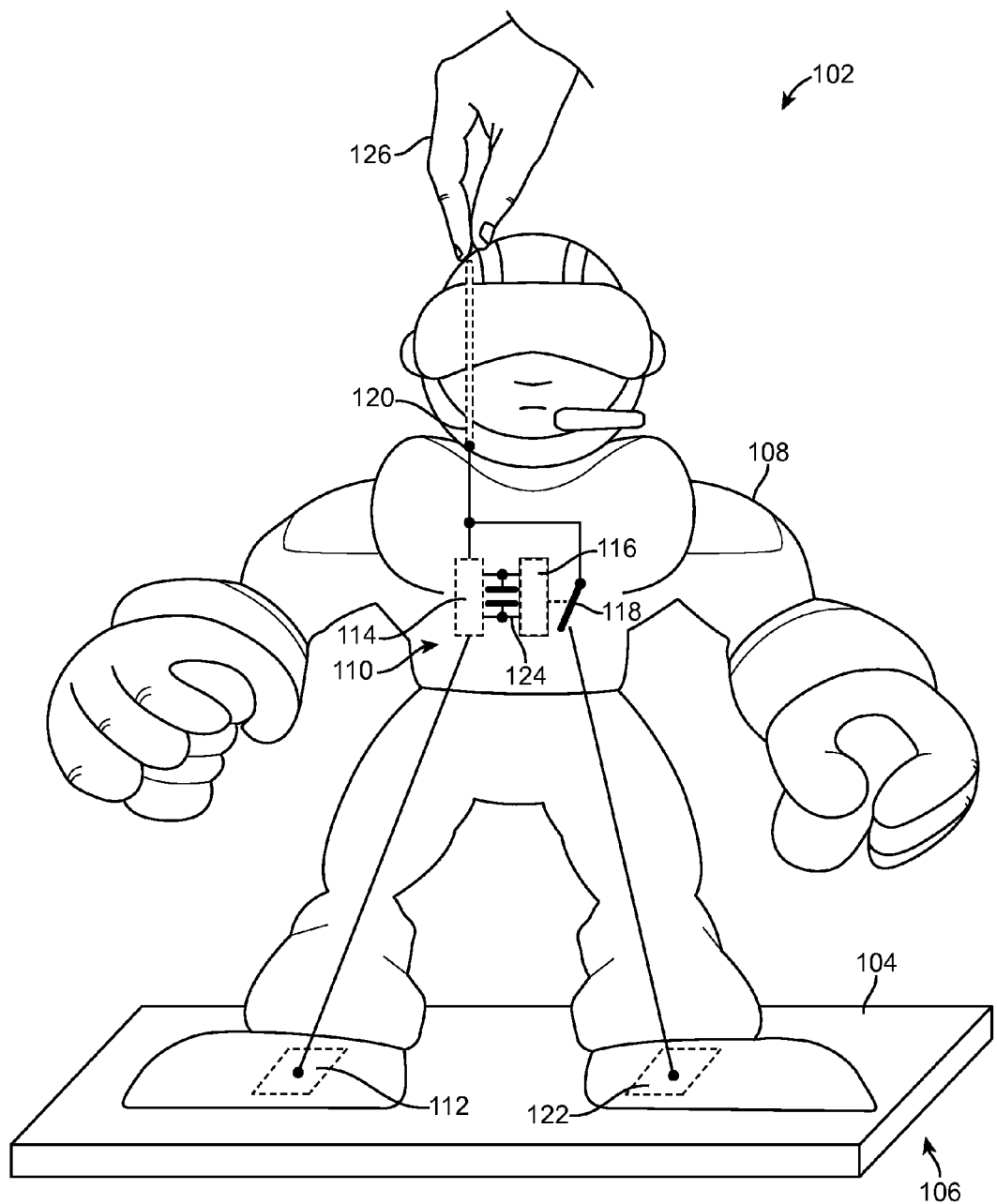
FIG. 1 illustrates an electrical circuit for showing interaction between the interactive device and touch-sensitive electronic display of a computer in accordance with a preferred embodiment of the present invention.

While this technology is illustrated and described in a preferred embodiment, interactive device and a system for interacting with a capacitive touch-sensitive electronic display of a computer may be produced in many different configurations, forms and materials. There is depicted in the drawings, and will herein be described in detail, as a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the technology described herein.

FIG. 1 illustrates a conceptual diagram for showing interaction between the interactive device 102 and the capacitive touch-sensitive electronic display 104 of a computer 106 in accordance with a preferred embodiment of the present invention. The interactive device 102 includes a housing 108 positioned on the top of the touch-sensitive electronic display 104 of the computer 106 and an electronic circuitry 110 placed inside the housing 108. Examples of computer 106 includes but not limited to game consoles, all-in-one computers, tablet computers, and smartphones, personal digital assistants (PDAs), satellite navigation devices, mobile phones, and video games and some books etc.

The electronic circuitry 110 includes a first electrode 112, an energy harvester 114 connected to the first electrode 112, a controller 116 connected to the energy harvester 114, an electronic switch 118 connected to the controller 116, a second electrode 120 positioned inside the housing 108 and a third electrode 122 positioned parallel to the first electrode 112 inside the housing 108 on the touch-sensitive electronic display 104.

In a preferred embodiment of the present invention, the first electrode 112 is positioned on the bottom portion of the housing 108 to determine the touch position with the touch-sensitive electronic display 104. In a preferred embodiment of the present invention a housing 108 is explained in detailed in conjunction with FIG. 3 of the present invention. The touch position on the touch-sensitive electronic display 104 is explained in detailed in conjunction with FIG. 4 of the present invention.

The energy harvester 114 receives the electrical energy from the electric field generated around the touch-sensitive electronic display 104 and transforms the received electrical energy into a DC Voltage. Examples of energy harvester 114 include but not limited to rectifier, diodes (e.g. Electrostatic Discharge Protection (ESD) diodes) and synchronized switches (e.g. complementary metal-oxide-semiconductor (CMOS) etc. In another embodiment of the present invention, the energy harvester 114 also receives energy from the backlight inverter or a near filed communication (NFC) reader or any other source, which emits electrical energy in form of electric field.

The controller 116 operates on the DC voltage received from the energy harvester. Further, the controller 116 generates a serial identification number for identifying the housing 108 through the touch-sensitive electronic display 104 of the computer 106. Examples of controller 116 include but not limited to micro-controller (MCU), system-on-chip (SOC), Field-programmable gate array (FPGA), CPOD and State machines etc.

The electronic switch 118 transmits the serial identification number received from the controller 116. The second electrode 120 positioned inside the housing 108 for allowing the user 124 to invoke a touch event to form a closed electrical circuit from the first electrode 112 to over the energy harvester 114 using the electric field from the touch-sensitive display 104 to operate the controller 116 and the electronic switch 118.

The third electrode 122 positioned parallel to the first electrode 112 inside the housing 108 for receiving the serial identification number processed by the controller 116 through the electronic switch 118. The electronic switch 118 connects the user 124 with the third electrode 122 to simulate the temporarily touch pattern to inform about the direction and the serial identification number to the touch-sensitive electronic display 104.

In a preferred embodiment of the present invention, the touch pattern is set when the user 124 touches the second electrode 120. Thus, allowing the processor of the computer 106 to determine the angle and the direction of the touch events from the distance calculated in between the first electrode 112 and the third electrode 122. Further, the processor of the computer 106 identifies the housing 108 from the serial identification number from the simulated temporarily touch pattern from the third electrode 122. The touch event is explained in detail in conjunction with FIG. 3 of the present invention. The angle determination and transfer of data from the first electrode 112 and the third electrode 122 are explained in detail in conjunction with FIG. 4 of the present invention.

In another embodiment of the present invention, the interactive device 102 includes a buffer 126 for storing extra DC voltage received from the energy harvester 114. Examples of buffer 126 includes but not limited to capacitor, gold cap, accumulator and thin film battery etc.

Figure 2:
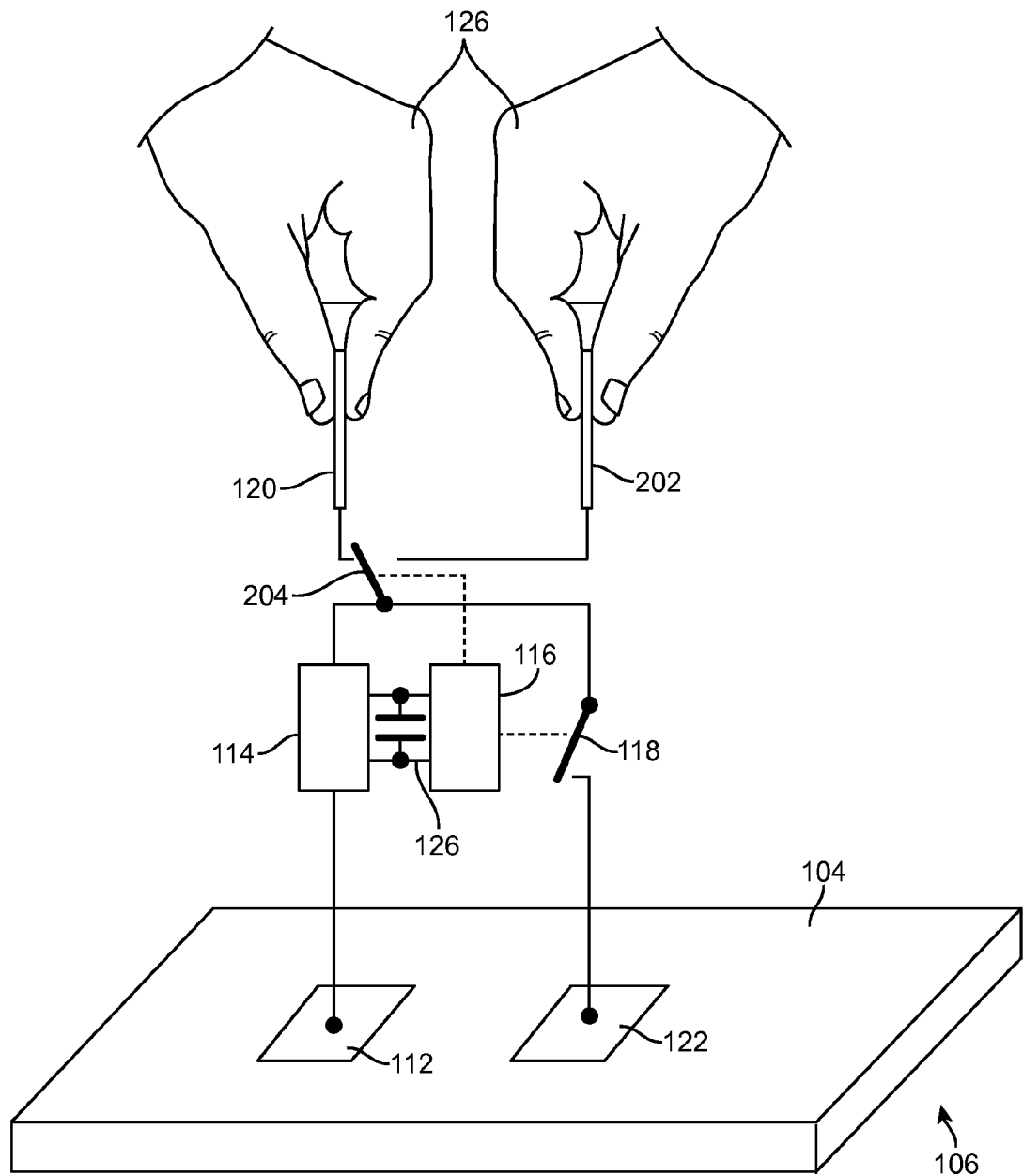
FIG. 2 illustrates an electrical circuit for showing interaction between the interactive device and touch-sensitive electronic display of a computer in accordance with another preferred embodiment of the present invention.

FIG. 2 illustrates an electrical circuit for showing interaction between the interactive device 102 and touch-sensitive electronic display 104 of a computer 106 in accordance with another preferred embodiment of the present invention. The interactive device 102 further includes a fourth electrode 202 connected to the first electrode 112 within the housing 108 to invoke a second touch event by the user 126 for generating second serial identification number from the controller 116.

The interactive device 102 further includes second electronic switch 204 to connect the fourth electrode 202 with the third electrode 122 controlled by the controller 116. The electronic switch 204 creates temporarily second touch pattern over the third electrode 122 to the touch-sensitive electronic display 104 to be calculated by the processor of the computer 106. In a preferred embodiment of the present invention, the touch pattern is set when the user 124 touches the fourth electrode 202.

The second electronic switch 204 connects the fourth electrode 202 with the third electrode 122 controlled by the controller 116. The second electronic switch 202 creates temporarily second touch pattern over the third electrode 122 to the touch-sensitive electronic display 104 to be calculated by the processor of the computer 106. The controller 116 operates the second electronic switch 204 with the second serial identification number and the processor of the computer 106 identifies the housing 108 from the second identification number from the simulated temporarily second touch pattern from the third electrode 122.

In a preferred embodiment of the present invention, the serial identification number and the second identification number is sent via the second electrode 120 and the fourth electrode 202 to the computer 106 after the position and orientation of the first electrode 112 and the third electrode 122 is calculated. The transfer of data is the result of the switching from the electronic switches such as electronic switch 118 and the second electronic switch 204 activated by the controller 116.

For exemplary purposes, the data generated from the second electrode 120 and the fourth electrode 202 by the touch event may be an action of hitting, playing, defense etc. However, it will be readily apparent to those skilled in the art that various data may be generated from the touch event invoked by the user 126.

Figure 3:
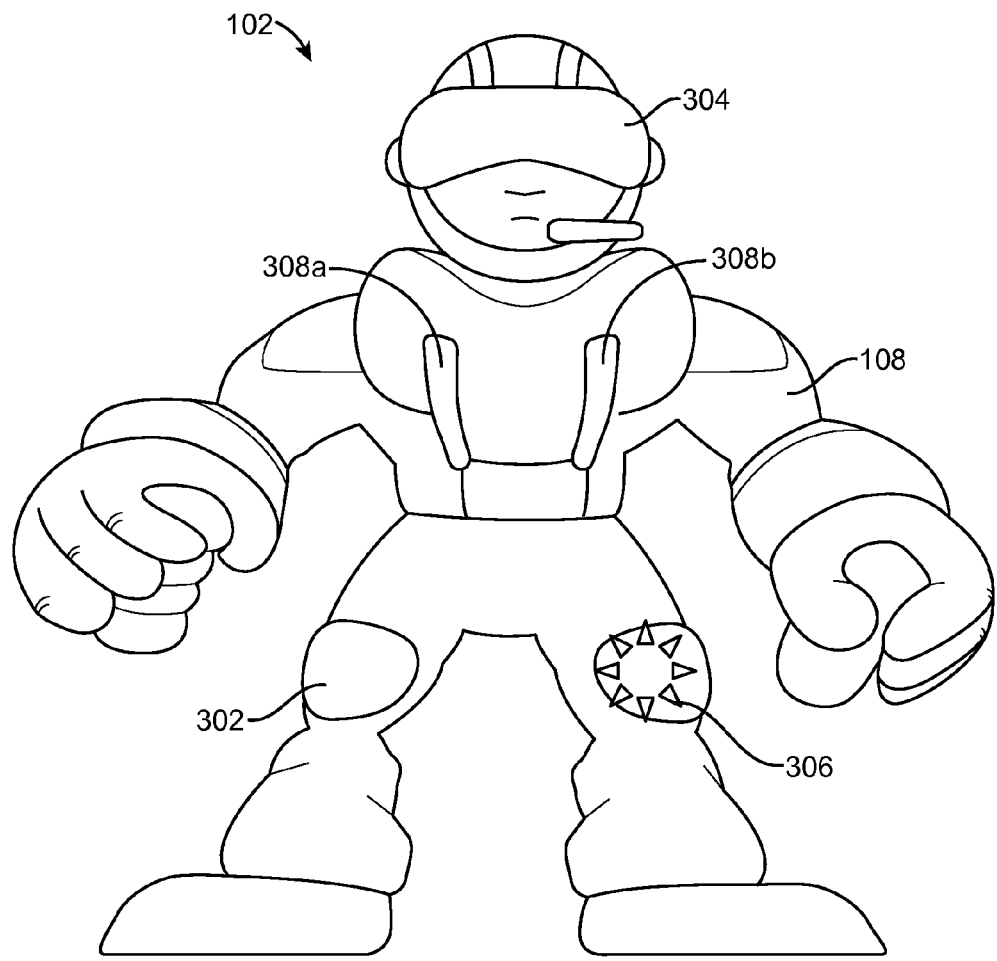
FIG. 3 illustrates a front view of an interactive device for interacting with the electric field of a touch-sensitive electronic display of a computer in accordance with a preferred embodiment of the present invention.

FIG. 3 illustrates a front view of an exemplary embodiment of an interactive device 102. In a preferred embodiment of the present invention, the housing 108 is of a super hero. However, it will be readily apparent to those skilled in the art that housing 108 may be produced in various ways without deviating from the scope of the present invention. In a preferred embodiment of the present invention, the bottom portion of the housing 108 is legs. The first electrode 112 is placed in one leg and the third electrode 122 is placed in another leg. For exemplary purposes, the housing 108 may be created in a shape of a car, bus, super woman, sword, shield, child, skate board etc. Generally, the housing 108 depends upon the type of gaming application installed in the processor of the computer (not shown in the FIG. 3).

In another embodiment of the present invention, the interactive device includes a light source 302 attached on the housing 108 and further connected to the controller (not shown in FIG. 3) for signalling light signals. In exemplary embodiment of the present invention, the light source 302 is a LED. However, it is readily apparent to those skilled in the art that various other types of light source 302 may be used without deviating from the scope of the present invention.

In another embodiment of the present invention, the interactive device 102 includes a display unit 304 attached on the housing 108 and further connected to the controller (not shown in FIG. 3) for displaying visual signals. In exemplary embodiment of the present invention, the display unit 304 is a LED screen. However, it is readily apparent to those skilled in the art that various other type of display unit 304 may be used without deviating from the scope of the present invention.

In another embodiment of the present invention, the interactive device 102 further includes an audio unit 306 connected to the housing 108 and further connected to the controller (not shown in FIG. 3) for signalling audio signals. In exemplary embodiment of the present invention, the audio unit 306 is a speaker. However, it is readily apparent to those skilled in the art that various other types of audio unit 306 may be used without deviating from the scope of the present invention.

In another embodiment of the present invention, the interactive device 102 further includes one or more sensors 308 such as 308a, 308b attached to the housing 108 for sensing physical quantities and generating a signal readable and transmittable by the controller (not shown in FIG. 3).

Figure 4:
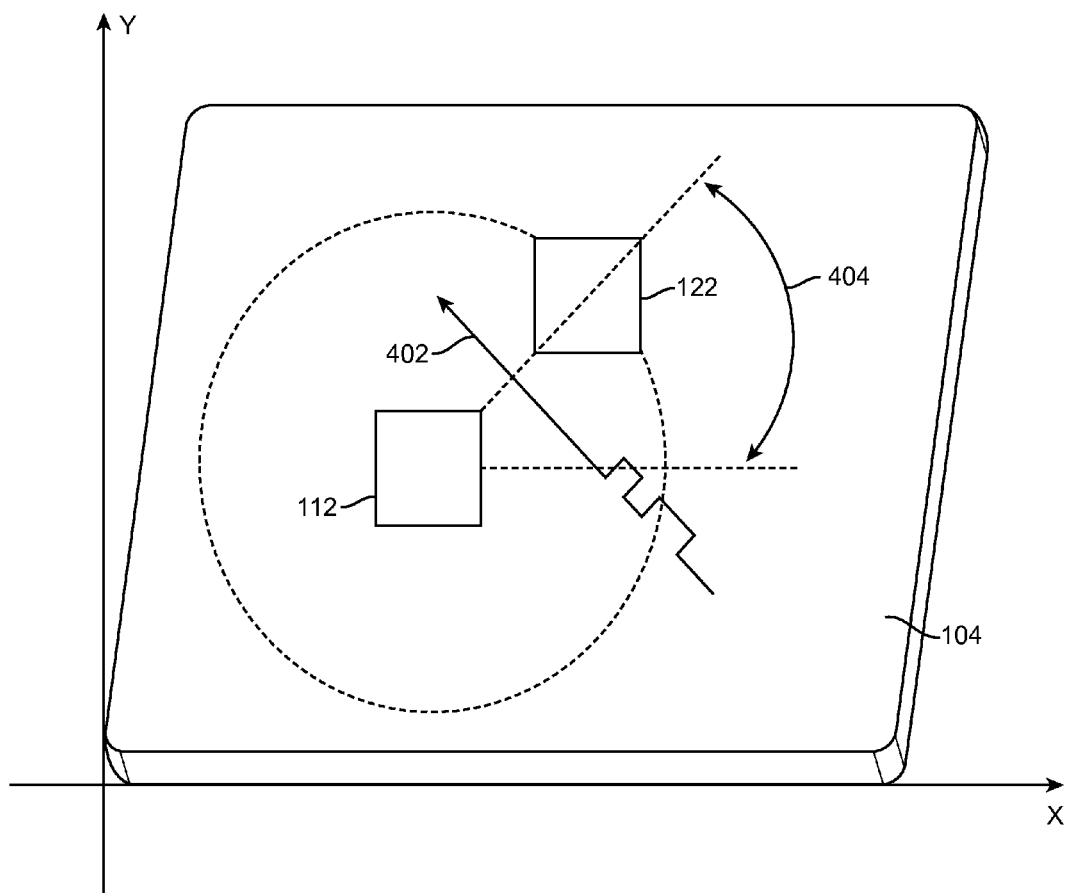
FIG. 4 illustrates a block diagram to illustrate calculation of angles.

FIG. 4 illustrates a conceptual diagram to illustrate an exemplary embodiment of calculation of angles. For exemplary purposes, the first electrode 112 references the center of electric field generated circle where the third electrode 122 creates an angle to with respect to the touch-sensitive electronic display 104. The angle is relative to the first electrode 112 and the XY co-ordinates of the touch-sensitive electronic display 104. The processor of the touch-sensitive electronic display 104 determines the angle created by the first electrode 112 and the third electrode 122, resulting in determination of the position and the orientation of the housing (not shown in FIG. 4) placed on the touch-sensitive electronic display 104. For exemplary purposes, a resulting direction vector 402 is calculated from the touch-sensitive electronic display 104. A doubles side arrow 404 shows an angle in between the first electrode 112 and the third electrode 122.

Figure 5:
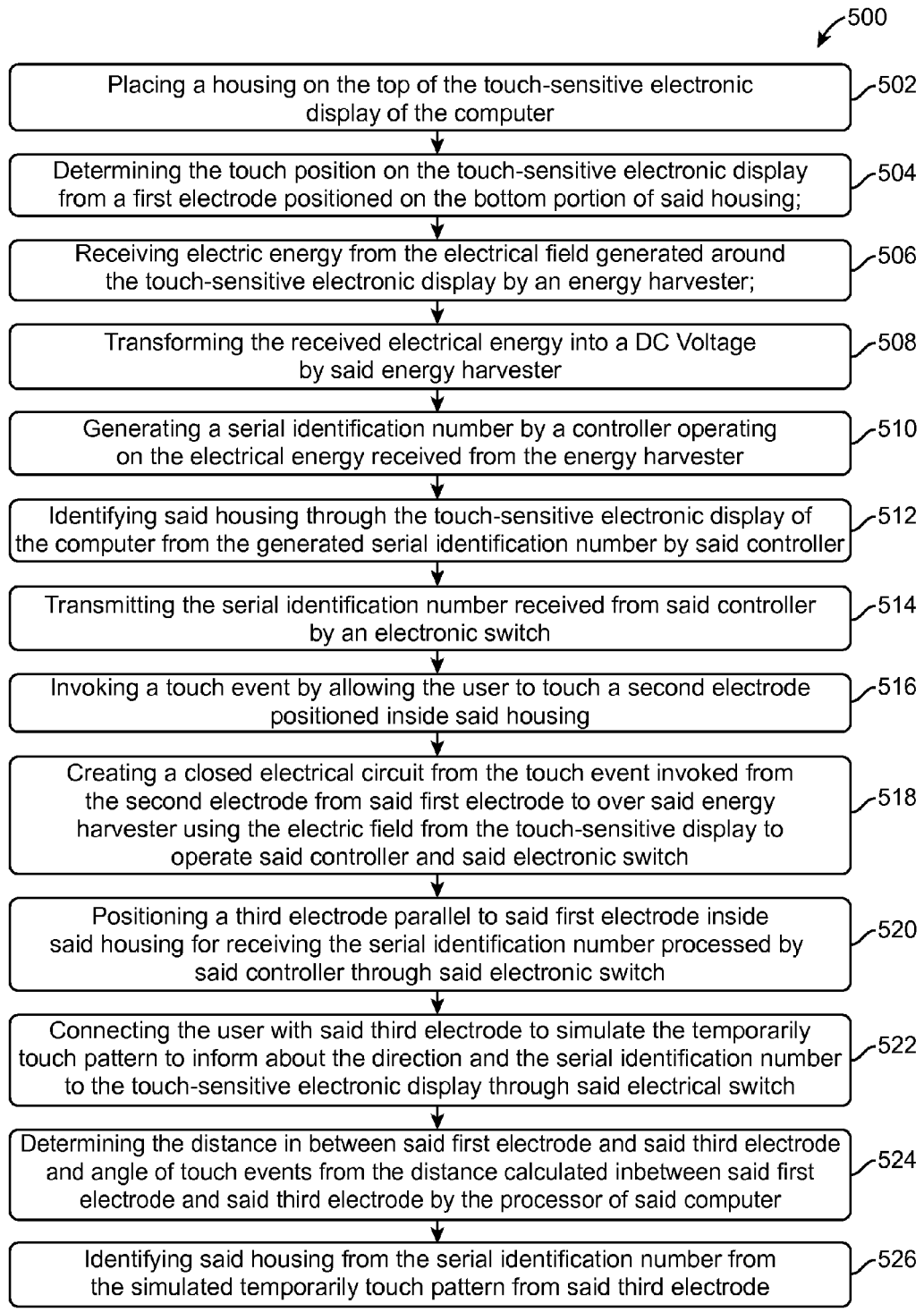
FIG. 5 is a flowchart of a method for interaction of a device with the electric field of a touch-sensitive electronic display of a computer.

FIG. 5 illustrates a flowchart of a method 500 for interaction of a device with a capacitive touch-sensitive electronic display of a computer. The method 500 initiates with a step 502 of placing housing on the top of the touch-sensitive electronic display of the computer. In a preferred embodiment of the present invention, the placement of the housing on the touch-sensitive electronic display is explained in conjunction with FIG. 1 and FIG. 2 of the present invention.

The step 502 is then followed by a step 504 of determining the touch position on the touch-sensitive electronic display from a first electrode positioned on the bottom portion of the housing. The touch position is explained through FIG. 4 of the present invention. The step 504 is then followed by a step 506 of receiving electric energy from the electrical field generated around the touch-sensitive electronic display by an energy harvester. The step 506 is then followed by a step 508 of transforming the received electrical energy into a DC Voltage by the energy harvester. The energy harvester is explained in detail in through of the FIG. 1 of the present invention.

The step 508 is then followed by a step 510 of generating a serial identification number by a controller operating on the electrical energy received from the energy harvester. The step 510 is then followed by a step 512 of identifying the housing through the touch-sensitive electronic display of the computer from the generated serial identification number by the controller operating on the electrical energy received from the energy harvester. The controller is explained in detail in conjunction with FIG. 1 of the present invention.

The step 510 is then followed by a step 514 of transmitting the serial identification number received from the controller by an electronic switch. The electronic switch is explained in detail in conjunction with FIG. 1 of the present invention. The step 514 is then followed by a step 516 of invoking a touch event by allowing the user to touch a second electrode positioned inside the housing. The step 516 is then followed by a step 518 of creating a closed electrical circuit from the touch event invoked from the second electrode from the first electrode to over the energy harvester using the electric field from the touch-sensitive display to operate the controller and the electronic switch. The touch event is explained in detail in conjunction with FIG. 4 of the present invention.

The step 518 is then followed by a step 520 of positioning a third electrode parallel to the first electrode inside the housing for receiving the serial identification number processed by the controller through the electronic switch. The step 520 is then followed by a step 522 of connecting the user with the third electrode to simulate the temporarily touch pattern to inform about the direction and the serial identification number to the touch-sensitive electronic display through said electrical switch. The touch pattern and the direction are explained in detail in conjunction with FIG. 4 of the present invention.

The step 522 is then followed by a step 524 of determining the distance in between said first electrode and said third electrode and angle of touch events from the distance calculated in between the first electrode and the third electrode by the processor of the computer. The touch events, angle and distance in between the first electrode and the second electrode are explained in detail in conjunction with FIG. 4 of the present invention.

The step 524 is then followed by a step 526 of identifying the housing from the serial identification number from the simulated temporarily touch pattern from the third electrode. The identification allows the interaction of the interaction device with the touch-sensitive electronic display of the computer. The process of identification of housing is explained in detail in conjunction with FIG. 4 of the present invention.

In another preferred embodiment of the present invention, the method 500 includes the step of storing extra DC Voltage received from said energy harvester in a buffer. The buffer is explained in detail in conjunction with FIG. 1 of the present invention.

In another preferred embodiment of the present invention, the method 500 includes the step of signalling light signals by a light source connected to the controller. Further, the method 500 includes the step of displaying video signals by a display unit connected to the controller and the step of playing audio signals by an audio unit connected to the controller. Further, the method 500 includes the step of sensing physical quantities and generating a signal by one or more sensors readable and transmittable by said controller. The light signals, audio signals, video signals and the sensors are explained in detail in conjunction with FIG. 3 of the present invention.

In another preferred embodiment of the present invention, the method 500 further includes the steps of placing a fourth electrode connected to the first electrode inside the housing, connecting the fourth electrode with the third electrode by a second electronic switch controlled by the controller, invoking second touch event by the user for generating second serial identification number from the controller, operating second electronic switch with the second serial identification number, creating second touch pattern by the electronic switch over the third electrode to the touch screen sensitive display to be calculated by the processor of the computer and identifying the housing from the second serial identification number from the simulated temporarily second touch pattern from the third electrode. The fourth electrode and the second electronic switch are explained in detail in conjunction with FIG. 2 of the present invention.

The present invention offers various advantages. The present invention operates on the electric field produced from the computing device and thus saves on cost and space by not requiring the battery. Further, the present invention operates on reduced number of electrodes connected to the touch screen for generating multiple touches and unlimited identification codes or other data. Thus, the present invention produces unlimited touch sequences to perform various actions from the action figure.

The foregoing discussion discloses and describes merely exemplary embodiments of the present invention. One skilled in the art will readily recognize from such discussion and from the accompanying drawings that various changes, modifications and variations can be made therein without departing from the spirit and scope of the invention.

The invention claimed is:

1. An interactive device for interacting with a capacitive touch-sensitive electronic display of a computer, the interactive device comprising:
   a housing positioned on the top of the touch-sensitive electronic display of the computer; and
   an electronic circuitry placed inside said housing, said electronic circuitry comprising:
      a first electrode positioned on the bottom portion of said housing to determine the touch position on the touch-sensitive electronic display;
      an energy harvester connected to said first electrode for receiving electrical energy from the electric field generated around the touch-sensitive electronic display and transforms the received electrical energy into a DC Voltage;
      a controller to operate on the DC voltage received from said energy harvester, said controller to generate a serial identification number, wherein the serial identification number to identify said housing through the touch sensitive electronic display of the computer;
      an electronic switch connected to said controller for transmitting the serial identification number received from said controller;
      a second electrode positioned inside said housing for allowing the user to invoke a touch event to form a closed electrical circuit from said first electrode to over said energy harvester using the electric field from the touch-sensitive display to operate said controller and said electronic switch; and
      a third electrode positioned parallel to said first electrode inside said housing for receiving the serial identification number processed by said controller through said electronic switch, wherein said electronic switch connects the user with said third electrode to simulate the temporarily touch pattern to inform about the direction and the serial identification number to the touch-sensitive electronic display;
   wherein the processor of said computer determines the distance in between said first electrode and said third electrode, further the processor leading to determination of the angle and direction of the touch events from the distance calculated in between said first electrode and said third electrode, further wherein the processor of the computer identifies said housing from the serial identification number from the simulated temporarily touch pattern from said third electrode.

2. The interactive device according to claim 1 further comprising a buffer to store extra DC Voltage received from said energy harvester.

3. The interactive device according to claim 1 further comprising a light source attached on said housing and connected to said controller for signalling light signals.

4. The interactive device according to claim 1 further comprising a display unit attached on said housing and connected to said controller for displaying visual signals.

5. The interactive device according to claim 1 further comprising an audio unit attached on said housing and connected to said controller for playing audio signals.

6. The interactive device according to claim 1 further comprising one or more sensors attached to said housing for sensing physical quantities and generating a signal readable and transmittable by said controller.

7. The interactive device according to claim 1 further comprising:
a fourth electrode connected to said first electrode within said housing, said fourth electrode invokes a second touch event by the user for generating second serial identification number from said controller; and
a second electronic switch to connect said fourth electrode with said third electrode controlled by said controller, said second electronic switch creates temporarily second touch pattern over said third electrode to the touch-sensitive electronic display to be calculated by the processor of the computer;
wherein said controller operates said second electronic switch with the second serial identification number, further wherein the processor of the computer identifies said housing from the second identification number from the simulated temporarily second touch pattern from said third electrode.

8. A method for interacting a device with a capacitive touch-sensitive electronic display of a computer, the method comprising the steps of:
placing a housing on the top of the touch-sensitive electronic display of the computer;
determining the touch position on the touch-sensitive electronic display from a first electrode positioned on the bottom portion of said housing;
receiving electric energy from the electrical field generated around the touch-sensitive electronic display by an energy harvester;
transforming the received electrical energy into a DC Voltage by said energy harvester;
generating a serial identification number by a controller operating on the electrical energy received from the energy harvester;
identifying said housing through the touch-sensitive electronic display of the computer from the generated serial identification number by said controller;
transmitting the serial identification number received from said controller by an electronic switch;
invoking a touch event by allowing the user to touch a second electrode positioned inside said housing;
creating a closed electrical circuit from the touch event invoked from the second electrode from said first electrode to over said energy harvester using the electric field from the touch-sensitive display to operate said controller and said electronic switch;
positioning a third electrode parallel to said first electrode inside said housing for receiving the serial identification number processed by said controller through said electronic switch;
connecting the user with said third electrode to simulate the temporarily touch pattern to inform about the direction and the serial identification number to the touch-sensitive electronic display through said electrical switch;
determining the distance in between said first electrode and said third electrode and angle of touch events from the distance calculated in between said first electrode and said third electrode by the processor of said computer; and
identifying said housing from the serial identification number from the simulated temporarily touch pattern from said third electrode.

9. The method according to claim 8 further comprising a step of storing extra DC Voltage received from said energy harvester in a buffer.

10. The method according to claim 8 further comprising a step of signalling light signals by a light source connected to the controller.

11. The method according to claim 8 further comprising a step of displaying video signals by a display unit connected to the controller.

12. The method according to claim 8 further comprising a step of playing audio signals by an audio unit connected to said controller.

13. The method according to claim 8 further comprising a step of sensing physical quantities and generating a signal by one or more sensors readable and transmittable by said controller.

14. The method according to claim 8 further comprising the steps of:
placing a fourth electrode connected to said first electrode inside said housing;
connecting said fourth electrode with said third electrode by a second electronic switch controlled by said controller;
invoking second touch event by the user for generating second serial identification number from said controller;
operating second electronic switch with the second serial identification number; and
creating second touch pattern by said electronic switch over said third electrode to the touch screen sensitive display to be calculated by the processor of the computer;
identifying said housing from the second serial identification number from the simulated temporarily second touch pattern from said third electrode.

15. An interactive toy system comprising:
a computer with a touch-sensitive electronic display;
a housing positioned on the top of the touch-sensitive electronic display of said computer; and
an electronic circuitry placed inside the housing, said electronic circuitry comprising:
a first electrode positioned on the bottom portion of said housing to determine the touch position on the touch-sensitive electronic display;
an energy harvester connected to said first electrode for receiving electrical energy from the electric field generated around the touch-sensitive electronic display and transforms the received electrical energy into a DC Voltage;
a controller to operate on the electrical energy received from said energy harvester, said controller to generate a serial identification number, wherein the serial identification number to identify said housing through the touch sensitive electronic display of the computer;
an electronic switch connected to said controller for transmitting the serial identification number received from said controller;
a second electrode positioned inside said housing for allowing the user to invoke a touch event to form a closed electrical circuit from said first electrode to over said energy harvester using the electric field from the touch-sensitive display to operate said controller and said electronic switch; and
a third electrode positioned parallel to said first electrode inside said housing for receiving the serial identification number processed by said controller through said electronic switch, wherein said electronic switch connects the user with said third electrode to simulate the temporarily touch pattern to inform about the direction and the serial identification number to the touch-sensitive electronic display;
a fourth electrode connected to said first electrode within said housing, said fourth electrode invokes second touch event by the user for generating second serial identification number from said controller; and a second electronic switch to connect said fourth electrode with said third electrode controlled by said controller, said electronic switch creates temporarily second touch pattern over said third electrode to the touch screen sensitive display to be calculated by the processor of the computer;

wherein the processor of said computer determines the distance in between said first electrode and said third electrode, further the processor leading to determination of angle and direction of the touch events from the distance calculated in between said first electrode and said third electrode, further wherein the processor of said computer identifies said housing either from the serial identification number from the simulated temporarily touch pattern from said third electrode.

16. The interactive device according to claim 15 further comprising a buffer to store extra DC Voltage received from said energy harvester.

17. The interactive device according to claim 15 further comprising a light source attached on said housing and connected to said controller for signalling light signals.

18. The interactive device according to claim 15 further comprising a display unit attached on said housing and connected to said controller for displaying visual signals.

19. The interactive device according to claim 15 further comprising an audio unit attached on said housing and connected to said controller for playing audio signals.

20. The interactive device according to claim 15 further comprising one or more sensors attached to said housing for sensing physical quantities and generating a signal readable and transmittable by said controller.

* * * * *